June 17, 1930.  R. LA FRANCE  1,764,268
GLASS FORMING MACHINE
Filed Nov. 1, 1926  3 Sheets-Sheet 2
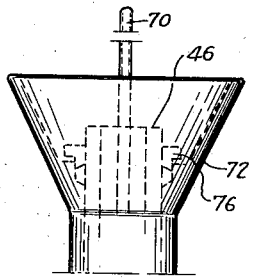
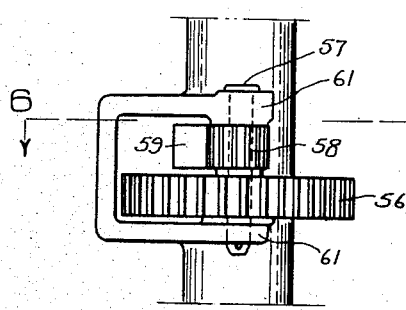
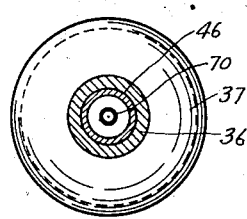
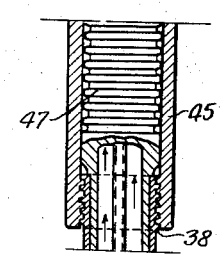
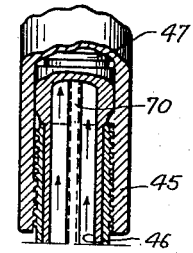
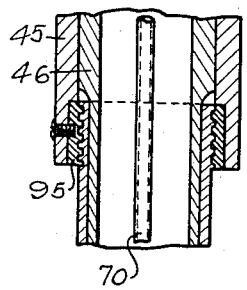
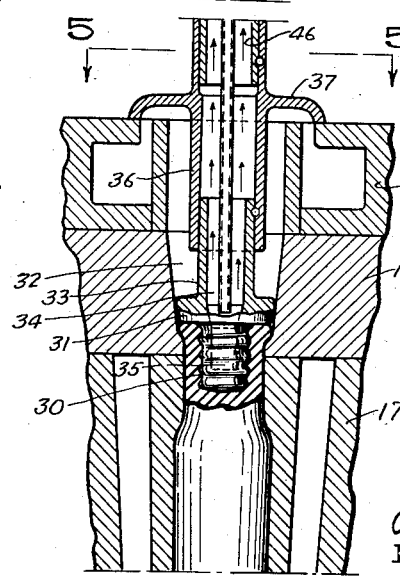
INVENTOR
Richard La France
BY
J. F. Rule
HIS ATTORNEY June 17, 1930.  R. LA FRANCE  1,764,268
GLASS FORMING MACHINE
Filed Nov. 1, 1926   3 Sheets-Sheet 3
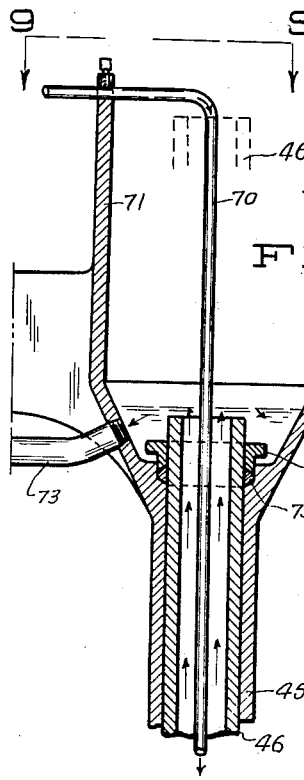
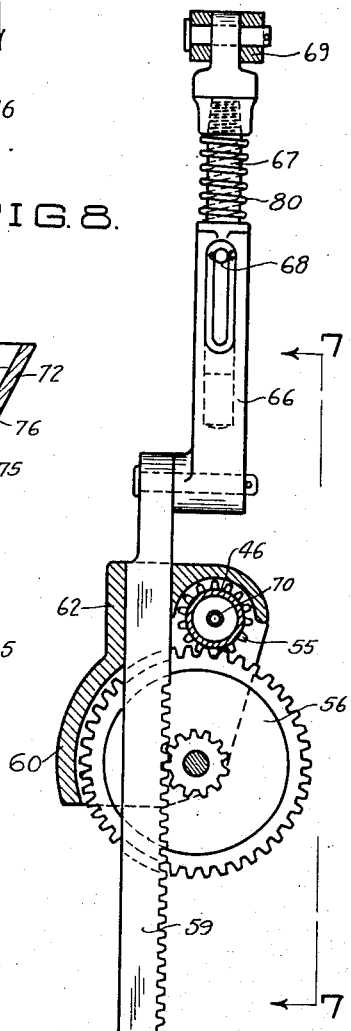
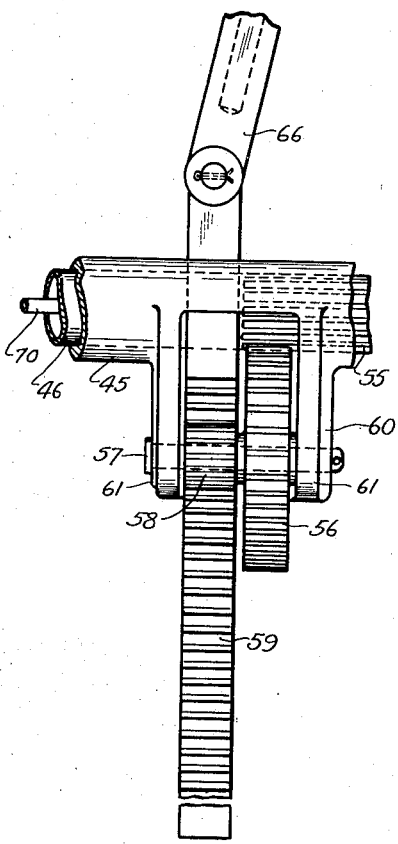
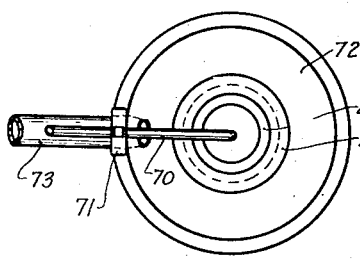
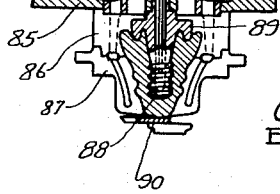
INVENTOR;
Richard La France
BY
J. F. Rule,
HIS ATTORNEY Patented June 17, 1930

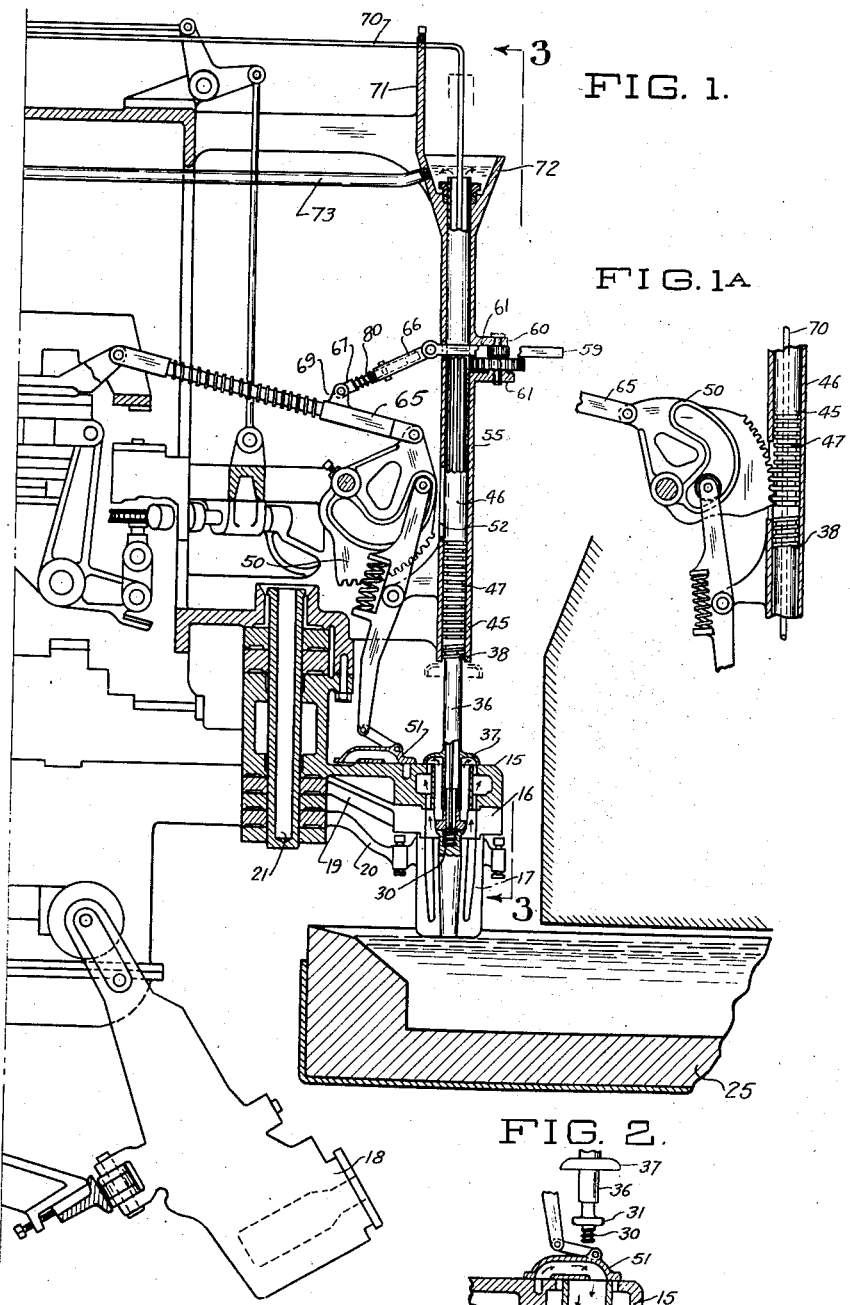

1,764,268

UNITED STATES PATENT OFFICE

RICHARD LA FRANCE, OF TOLEDO, OHIO, ASSIGNOR TO OWENS-ILLINOIS GLASS COMPANY, OF TOLEDO, OHIO, A CORPORATION OF OHIO

GLASS-FORMING MACHINE

Application filed November 1, 1926. Serial No. 145,456.

The present invention relates to improvements in glass forming machines and particularly to means for forming internal screw threads on bottles and other ware.

An object of the invention is to provide means whereby the principle of operation and main elements of an Owens suction type machine may be utilized in the production of ware having internal screw threaded necks, said means necessitating only relatively slight changes in the present construction. For a full disclosure of the Owens type machine to which the present invention is applicable, reference may be had to Patent No. 1,185,687, issued to me on June 6, 1916.

Another feature of this invention is the provision of novel means for continuously circulating water or other suitable cooling medium through the thread forming member so that overheating is prevented and highly desired partial chilling of the neck portion of a blank is obtained.

A further feature is the provision of a novel means for withdrawing the thread forming member from the neck portion of the blank to a position permitting movement of a blow slide to its operative position in the ordinary manner to give the glass its final blow in the finishing mold.

A still further feature of this invention is the provision of means adaptable for use in conjunction with an Owens suction type machine to produce pressed ware having internal screw threads.

Other objects will be apparent hereinafter.

In the accompanying drawings:

Fig. 1 is a sectional elevation showing the application of the present invention to an Owens suction type machine, the parts being in their initial thread forming position.

Fig. 1-A is a detail view illustrating auxiliary means for lifting the thread forming member after the same has been rotated and withdrawn from the neck of the blank, said lifting means being in its uppermost position.

Fig. 2 is a detail view illustrating the relation of the thread forming member, neck mold and blowing slide, when the lifting device is in the position shown in Fig. 1-A.

Fig. 3 is an elevation, part in section and part taken along the line 3—3 of Fig. 1.

Fig. 4 is a detail sectional elevation of the lower portion of the thread forming member and its cooling means, said member being shown removed from the neck portion to the extent effected by rotation.

Fig. 5 is a sectional view taken along the line 5—5 of Fig. 3.

Fig. 5-A is a detail section of a slight modification of the threaded connection between the mandrel carrier and the guide member.

Fig. 6 is a sectional view taken along the line 6—6 of Fig. 3.

Fig. 7 is an elevation taken along the line 7—7 of Fig. 6.

Fig. 8 is a sectional view of the upper portion of the apparatus showing the manner in which a cooling medium is directed to and from the passageway leading to the thread forming member.

Fig. 9 is a detail view taken along the line 9—9 of Fig. 8.

Fig. 10 is a detail sectional view illustrating the manner in which articles may be pressed in a combined blank and finishing mold applicable to an Owens suction type machine.

Fig. 11 is a part sectional elevation of an article pressed in the molds shown in Fig. 10.

Referring to the drawings, the forming machine comprises a rotatable carriage equipped with an annular series of individual dripping frames or units, each including a relatively fixed blowing head 15, a partible neck mold 16, and a sectional blank mold 17. Co-operating with each unit is a finishing mold 18 which is also formed in sections movable toward and from each other. The neck and blank mold sections are provided with carrying arms 19 and 20, respectively, which are journalled to a vertical pivot pin 21. Means (not shown) is provided for periodically opening and closing the neck and blank mold sections at proper intervals. The finishing mold frame is pivoted at its inner end to the mold carriage for vertical swinging, and, under influence of a stationary cam track, is periodically lifted to enclose blanks or parisons suspended from the neck mold 16.

As the mold carriage rotates, the dipping frames or units are successively brought to a position at which they are lowered to permit the blank mold to contact with the surface of the glass. The blank and neck molds are charged with glass drawn in by suction applied through the blowing and gathering head 15. The charge of glass is then blown to parison form and after separation of the blank molds, is suspended from the neck mold for enclosure by the finishing molds, in which the article is blown to final form. After this final blow, the finishing and neck molds are opened to eject the article from the machine.

According to the present invention, there is provided a thread forming mandrel movable into and out of the neck mold. This mandrel may also, and preferably does, project slightly into the upper end of the blank mold and is of such length that it will form an initial blow opening of necessary size. This mandrel includes a threaded shank 30 integrally formed with a circular head 31, adapted at times to contact with the walls of a vertical passageway 32 extending through the neck mold 16 (Fig. 3) and form the finish of the article being produced. A tubular extension or stem 33 rises from the head 31, the opening 34 through this extension 33 communicating at its lower end with a recess or chamber 35 formed in the threaded shank.

The upper end of the stem 33 is telescoped within the lower end of a vertical tube or sleeve 36 and is pinned or otherwise rigidly attached thereto. This tube or sleeve 36 is provided with a cap 37, which, during charging of the molds, is seated upon the blowing head 15 (Figs. 1 and 3), thereby sealing the upper side of said head and permitting exhaust of air from the blank mold through the blowing head in the usual manner. This tube 36 extends upwardly beyond the cap 37 and is formed with external screw threads 38 whose pitch corresponds to that of the threads on the shank or mandrel 30 which forms the internal threads on the container neck. These threads 38 mesh with correspondingly pitched internal threads formed in a fixed guide member 45, said guide member in this instance being in the form of a tube or sleeve connected to the dipping frame. A separate removable thread carrying ring 95 (Fig. 5—A) may be substituted for the threads in the guide member 45 to facilitate adjustment of the machine for making different types of threads. The provision of the rings 95 allows production of ware with differently pitched threads by simply replacing one ring with another and changing the mandrel accordingly. A carrier 46 for the thread forming mandrel is slidable through the guide member and has its lower end telescoped into the upper end of the tube 36 above the cap 37 and pinned or otherwise fixed thereto. This carrier is in the form of a tube 46 and is provided with a set of rack teeth 47 at a point just above the screw threads 38. These rack teeth 47 extend entirely around the vertical tube 46 so that regardless of their relation to associated parts, they will mesh with the teeth of a gear segment 50 which is operated at intervals by suitable cam mechanism. The guide member 45 is formed with a vertical slot 52 on its inner side permitting engagement between the rack teeth of the vertical tube or carrier 46 and the teeth of the gear segment 50, at proper intervals.

The carrier tube 46 (Figs. 1 and 3) is formed at a point above the rack teeth with longitudinally extending gear teeth 55 which mesh with the teeth of a relatively large spur gear 56. This spur gear 56 is fixed to a vertical stub shaft 57 carrying a small spur gear or pinion 58, the teeth of the latter running in mesh with the teeth of a rack bar 59. This rack bar (Figs. 6 and 7) is of such length that it is at all times held in a guide 62. The pinion, spur gear, and rack bar are mounted in a bracket 60, including vertically spaced arms 61 (Figs. 3, 6 and 7). This bracket (Fig. 6) is provided with a relatively long bearing 62 which serves as a guide for the rack bar 59, thereby assuring uninterrupted operative engagement between the rack bar and pinion. Thus, it is seen that with reciprocation of the rack bar 59, the thread forming member will be rotated in one direction or the other due to rotation of the shafts or tubes 36 and 46. Only a sufficient number of teeth are formed on the rack bar 59, to effect disengagement of the mandrel from the blank (Figs. 6 and 7). Yieldable link connection is formed between the inner end of the rack bar 59 and the operating arm 65 which periodically actuates the gear segment 50 (Fig. 1), such connection comprising a sleeve 66 and rod 67, the latter having one end telescoped within the sleeve and held against accidental separation by a pin and slot connection 68. One end of the sleeve 66 is pivoted to the adjacent or inner end of the rack bar 59, while the opposite or inner end of the rod 67 is pivoted between upstanding ears 69 carried by the operating arm 65 of the gear segment operating mechanism. A coil spring 80 surrounds the rod 67 (Fig. 6) and provides means to prevent breaking or injury of parts in the event the rack bar or associated gears become jammed or otherwise inoperative.

Due to the fact that formation of perfect internal threads requires retention of the thread forming member in direct contact with the molten glass for a relatively long period of time to chill and set the glass, it becomes necessary to provide some means for cooling this member. To this end, the threaded shank or mandrel 30 is of hollow formation and communicates directly with the continuous vertical passageway through the series of inter-connected tubes permitting supply therethrough of a cooling medium. Cooling is obtained by supplying water or other suitable medium to the mandrel by way of a supply tube 70 which is radially adjustably supported in a bracket 71 at the upper end of the carriage, said tube extending downwardly and terminating adjacent the entrance to the recess in the thread forming member. This arrangement insures direct application of fresh cooling medium to the proper areas. The water or other cooling medium fills the passageway through the set of interconnected tubes and flows out of the upper end of the main tube 46 into a funnel 72. From this funnel, which is formed upon the upper end of the guide member 45, the water or other cooling medium is conducted inwardly through a pipe 73 to any preferred point. This arrangement provides for continuous circulation of a cooling medium through the thread forming member and allows continuous application of fresh cooling medium to this member. Because of the slidable connection between the carrier for the thread forming member and the guide member 45 (Fig. 8), a packing 75 is placed at the upper end of the guide member to prevent water leakage, said packing extending around the tube and being held in position by a retaining nut 76.

When the machine is operating, a charge of molten glass is drawn into the blank and neck molds (Figs. 1 and 3), the thread forming member at this particular time being projected into the two molds so that the glass fills the entire space around the mandrel to form internal threads on the neck portion of the blank. Circulation of a cooling medium through the mandrel permits retention of said mandrel in the neck portion for a sufficient length of time to allow such chilling and setting of the threads and finish, that when the thread forming member is withdrawn and air pressure is applied to blow the article to its final form, there will be very little, if any, tendency to blow away or stretch the glass. Such stretching or blowing away of glass in this area, would result in the production of an article having distorted threads and an improperly formed finish. Following this chilling and setting of the threads and finish, suitable cam mechanism (not shown) operates to rock the gear segment 50 and due to the link connection between the segment operating arm 65 and the rack bar 59, the rack bar is moved, causing rotation of the tubes 36 and 46 and a corresponding degree of rotation of the thread forming mandrel 30. The threaded connection between the upper end of the tube 36 which carries the thread forming mandrel, and the guide member 45, results in the withdrawal of the thread forming member from the neck of the parison when the tubes are rotated in the proper direction (ordinarily counterclockwise). The rack teeth 47 on the main tube 46 are so positioned that they are engaged by the teeth of the gear segment 50 just after the thread forming member is withdrawn from the neck portion of the parison to a predetermined station, so that further movement of the gear segment causes additional lifting of the mandrel without rotation to substantially the Figure 2 position. Simultaneously with complete withdrawal of the mandrel, the blow slide 51 is shifted to the Fig. 2 position, permitting blowing of the ware to its final form. The final blow may be obtained in the usual or any preferred manner, after which the article is ejected from the machine at a predetermined station.

In adapting this apparatus to the production of pressed ware such as insulators (Figs. 10 and 11), a blowing head 85, neck mold 86 and a combined blank and finish mold 87 are employed. A charge of molten glass is drawn into the molds 86 and 87, and a thread forming mandrel 88 which has been previously projected into said mold, forms a threaded socket in the insulator (Figs. 10 and 11). This mandrel includes a circular head 89 which is suitably shaped to form the usual insulator base. After the charge of glass has been drawn into the molds, a cutoff 90 moves across the bottom of the mold in the usual manner to sever the glass string portions, but is retained in such position for a greater length of time than ordinarily for the purpose of closing the lower end of the mold cavity and serving as a bottom plate during setting of the glass. Since blowing of the article is unnecessary, the mandrel 88 need be lifted only a sufficient distance to disengage it from the glass and provide clearance for ejection of the article from the molds after they have been opened. Rotation of the carrying or lifting tube 91 by means of a rack and pinion mechanism such as that employed in the preceding form, operates to withdraw the thread forming mandrel 88 to the necessary degree without assistance from other means.

Manifestly, certain changes may be resorted to within the spirit and scope of the appended claims.

What I claim is:

1. In a glass forming machine, the combination of a continuously rotating mold carriage, a forming mold and blowing head on the carriage, a thread forming member movable into and out of the mold through said blowing head, means for charging the mold while said member is projected into the mold, a tubular guide member mounted vertically upon the carriage in alignment with said mold and blowing head, a carrier for the thread forming member, reciprocable and rotatable in the guide member, means engagable to rotate the carrier and simultaneously lift the thread forming member to a predetermined station above the glass, and means operable by and in timed relation with the rotating means to elevate the thread forming member to a position above said station and the blowing head.

2. In a glass forming machine, a blowing head, cooperating blank and neck molds associated with said head, a thread forming member movable into and out of said molds, means for charging the molds while the thread forming member is projected into the molds, a rotatable and reciprocable carrier connected to the thread forming member, means for causing rotation of the carrier to disengage the member from said glass, and separate means actuated by continued movement of the rotating means for elevating said member beyond the point of disengagement with the glass.

3. In a glass forming machine, the combination of a blowing head, cooperating blank and neck molds associated with the blowing head, a thread forming member movable into and out of the molds through said head, means for charging the molds while the thread forming member is in the molds, a cam, mechanism actuated thereby for rotating said member causing elevation of the member to a point within the blowing head, and mechanism actuated by said cam for further elevating said member without rotation, said mechanisms being interconnected and arranged to cause uninterrupted movement of the thread forming member from the blank mold to its uppermost position.

4. In a glass forming machine, charge receiving and shaping means, an internal screw thread forming mandrel adapted for projection into said shaping means prior to and during charging of the latter, mechanism for rotating said mandrel to disengage the latter with the glass, auxiliary means for additionally elevating said mandrel, and connection between the rotating mechanism and auxiliary lifting means for bringing the auxiliary means into operation simultaneously with disengagement of the mandrel with the glass by rotation.

5. In a machine for forming hollow glass articles, the combination of a mold, a forming member projecting into the mold and having a spiral surface formation for imparting a corresponding formation to the interior surface of an article formed in the mold, mechanism for imparting a spiral movement to the forming member for withdrawing it from the mold, a separate mechanism for moving the forming member lengthwise away from the mold after said spiral movement, and an actuating device connected to both said mechanisms and operable by a single continuous movement to operate said mechanisms in succession.

6. In a machine for forming hollow glass articles, the combination of a blank mold, a neck mold, means for introducing a charge of glass into the molds, a rod projecting into the molds and having a screw threaded or spiral surface formation for forming a threaded surface on the interior of a blank within the molds, mechanism including a train of gears for imparting to said rod a combined rotative and lengthwise movement for withdrawing it from the mold, mechanism for imparting a straight line movement of the rod away from the mold, and an actuating device connected to said mechanisms and arranged to operate them in succession by a single movement of the actuating device.

Signed at Toledo, in the county of Lucas and State of Ohio, this 28th day of October, 1926.

RICHARD LA FRANCE.